US008064641B2

(12) United States Patent
Anchyshkin et al.

(10) Patent No.: US 8,064,641 B2
(45) Date of Patent: Nov. 22, 2011

(54) SYSTEM AND METHOD FOR IDENTIFYING OBJECTS IN VIDEO

(75) Inventors: Yegor Anchyshkin, Kyiv (UA); Yuriy Musatenko, Kyiv (UA); Kostyantyn Milshteyn, Kyiv (UA); Volodymyr Kyyko, Kiev (UA); Ivan Kovtun, Kyiv (UA); Vyacheslav Matsello, Kyiv (UA); Mykhailo Schlesinger, Kiev (UA)

(73) Assignee: Viewdle Inc., Palo Alto, CA (US)

( * ) Notice: Subject to any disclaimer, the term of this patent is extended or adjusted under 35 U.S.C. 154(b) by 971 days.

(21) Appl. No.: 11/949,128

(22) Filed: Dec. 3, 2007

(65) Prior Publication Data

US 2009/0116695 A1 May 7, 2009

Related U.S. Application Data

(60) Provisional application No. 60/986,234, filed on Nov. 7, 2007.

(51) Int. Cl.
G06K 9/00 (2006.01)

(52) U.S. Cl. .......................... 382/103; 382/181; 382/232

(58) Field of Classification Search .................. 382/100, 382/232, 181, 103
See application file for complete search history.

(56) References Cited

U.S. PATENT DOCUMENTS

| 6,006,226 | A * | 12/1999 | Cullen et al. .................. 382/232 |
| 6,012,069 | A * | 1/2000 | Shibazaki ............................. 1/1 |
| 6,754,389 | B1 | 6/2004 | Dimitrova et al. |
| 7,031,982 | B2 * | 4/2006 | Tanigawa et al. ....................... 1/1 |
| 7,765,231 | B2 * | 7/2010 | Rathus et al. ................. 707/783 |
| 2001/0035907 | A1 | 11/2001 | Broemmelsiek |
| 2002/0001393 | A1 * | 1/2002 | Jones et al. .................... 382/100 |
| 2003/0197779 | A1 | 10/2003 | Zhang et al. |
| 2003/0218672 | A1 | 11/2003 | Zhang et al. |
| 2004/0017933 | A1 | 1/2004 | Lestideau |
| 2004/0048605 | A1 * | 3/2004 | Schaefer et al. ........... 455/414.2 |
| 2004/0223631 | A1 | 11/2004 | Waupotitsch et al. |
| 2004/0236791 | A1 * | 11/2004 | Kinjo .......................... 707/104.1 |
| 2005/0207622 | A1 * | 9/2005 | Haupt et al. .................. 382/118 |
| 2006/0012677 | A1 * | 1/2006 | Neven et al. .................... 348/61 |
| 2006/0155398 | A1 | 7/2006 | Hoffberg et al. |
| 2006/0165258 | A1 | 7/2006 | Avidan |

(Continued)

OTHER PUBLICATIONS

"International Application Serial No. PCT/US2008/012521, International Search Report and Written Opinion mailed Jan. 6, 2009", 11 pgs.

(Continued)

Primary Examiner — Hadi Akhavannik
(74) Attorney, Agent, or Firm — Fenwick & West LLP

(57) ABSTRACT

A method for processing digital media is described. In one example embodiment, the method may include detecting an unknown object in a video frame, receiving inputs representing probable identities of the unknown object in the video frame from various sources, and associating each input with the unknown object detected in the video frame. The received inputs may be processed, compared with reference data and, based on the comparison, probable identities of the object associated with the input derived. The method may further include retrieving a likelihood of the input to match the unknown object from historical data and producing weights corresponding to the inputs, fusing the inputs and the relative weight associated with each input, and identifying the unknown object based on a comparison of the weighted distances from the unknown identify to a reference identity. The relative weights are chosen from the historical data to maximize correct recognition rate based on the history of recognitions and manual verification results.

25 Claims, 9 Drawing Sheets

U.S. PATENT DOCUMENTS

2006/0200260 A1    9/2006   Hoffberg et al.
2006/0240862 A1*  10/2006   Neven et al. ............... 455/550.1
2007/0067482 A1    3/2007   Johnson et al.
2007/0239778 A1   10/2007   Gallagher

OTHER PUBLICATIONS

International Application Serial No. PCT/US2008/12502 Search Report mailed Jan. 9, 2009.

International Application Serial No. PCT/US2008/12502 Written Opinion mailed Jan. 9, 2009.

Viola, P. et al., "Robust Real-Time Object Detection," Second International Workshop on Statistical and Computational Theories of Vision—Modeling, Learning, Computing, and Sampling, Vancouver, Canada, Jul. 13, 2001, pp. 1-25.

* cited by examiner

SYSTEM AND METHOD FOR IDENTIFYING OBJECTS IN VIDEO

This application claims the benefit of priority under 35 U.S.C. 119(e) to U.S. Provisional Patent Application Ser. No. 60/986,234, filed on Nov. 7, 2007, which is incorporated herein by reference.

FIELD

This application relates to a system and method for processing digital media.

BACKGROUND

In order to perform video searching, metadata is often associated with video clips and then stored in a database. The database may then be searched using keywords and, if a corresponding keyword is found, an associated video clip is then identified.

BRIEF DESCRIPTION OF DRAWINGS

Example embodiments are illustrated by way of example and not limitation in the figures of the accompanying drawings, in which like references indicate similar elements and in which.

DETAILED DESCRIPTION

The example embodiments described herein may be implemented in an operating environment comprising software installed on a computer, hardware, or a combination of software and hardware. The computer implementing the technology may have more than one processor. The technique described herein may be utilized to automatically identify persons in video clips based on information from various sources. One source may be the visual image of the person in the video. The visual image may be compared to known images, and based on the comparison, the identity of the visual image may be suggested. Another source of the information may be subtitles accompanying the video clip. The text in the subtitles may be searched for possible mention of the name of the person appearing in the video.

Yet another source of the information may be the audio accompanying the video clip. The audio may be converted to text and similarly searched for names of the person appearing in the video clip. Another possible source of the information may be the text appearing in the video. For example, in a news broadcast, interviewees are often labelled onscreen with their names and other relevant information. The names in the video clip may be recognized using a character recognition technique. Another source of information may be an EPG (Electronic Program Guide) that may contain, among other information, the video clip title and genre. Based on the suggestions generated by these various sources, the person appearing in the video may be identified. The technique allows making identification with a higher degree of certainty than, for example, identification based on the visual image alone.

Figure 1:
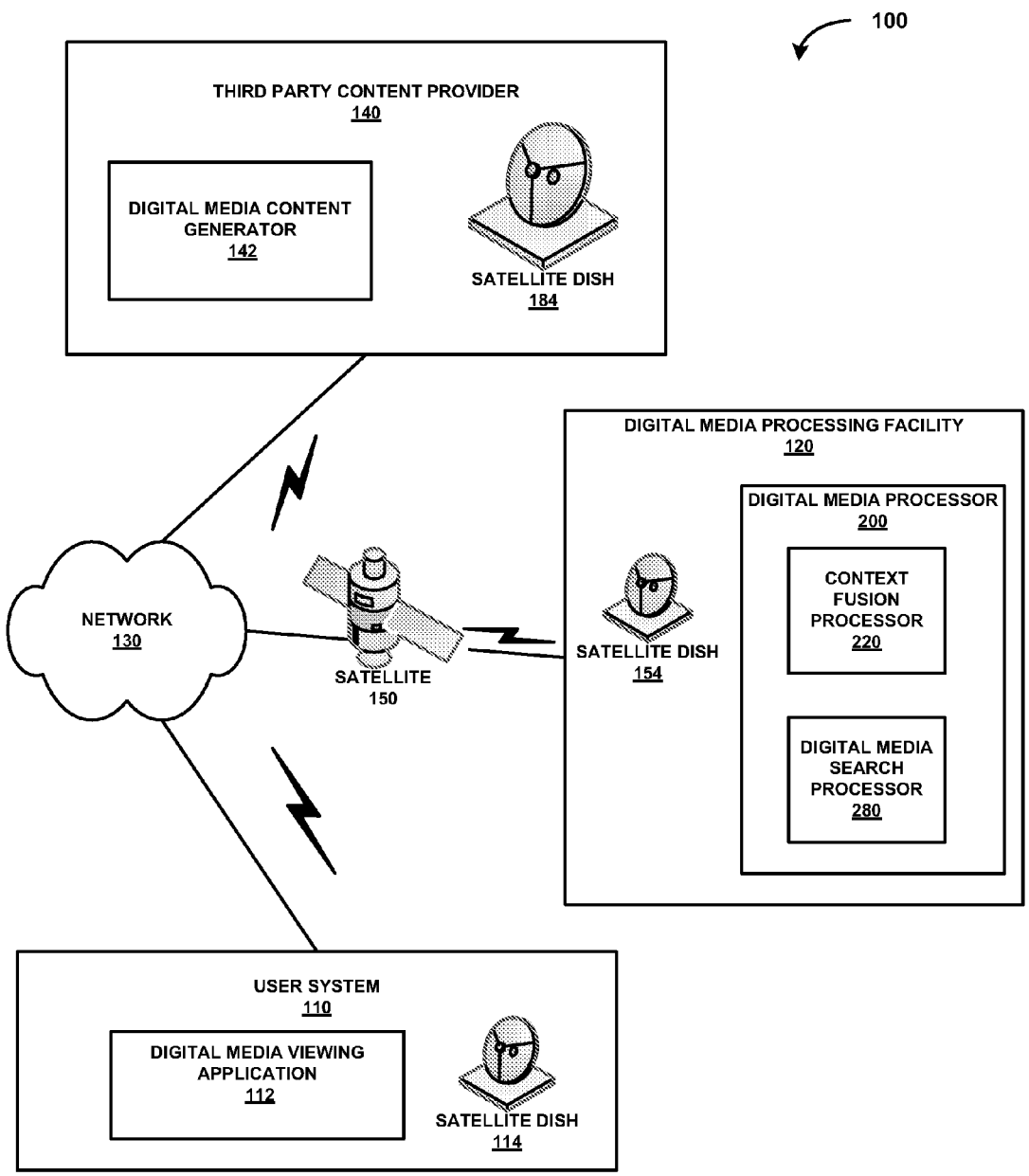
FIG. 1 is a block diagram showing architecture within which a system and method for processing digital media are implemented, in accordance with an example embodiment.

FIG. 1 shows an example environment 100, within which a method and system to process digital media may be implemented. As shown in FIG. 1, the example environment 100 may comprise a user system 110, a digital media processing facility 120, a network 130, a third party content provider 140, and a satellite 150.

The user system 110 may comprise a digital media viewing application 112 and a satellite dish 114. The user system 110 may be a general purpose computer, a TV (television set), a PDA (Personal Digital Assistant), a mobile telephone, a wireless device, and any other device capable of visual presentation of images (including text) acquired, stored, or transmitted in various forms. The digital media viewing application 112 may include any application software that facilitates display of the digital media via the user system 110. The digital media viewing application 112 may be run at the user system 110, third party content provider 140, or at the digital media processing facility 120. In some example embodiments, the digital media viewing application 112 may be distributed across different systems.

The satellite dish 114, in one example embodiment, is a type of antenna designed for a specific purpose of transmitting signals to and/or receiving signals from satellites. The satellite dish 114 may be manufactured according to varying sizes and designs and may be used to receive and transmit digital data to a satellite. The satellite dish 154 may be a part of the digital media processing facility 120 and installed to communicate to the third party content provider 140 via the satellite 150. The digital media processing facility 120 may be a mobile, or a transportable structure, including installed electrical and electronic wiring, cabling, and equipment and supporting structures, such as utility, ground network, wireless network, and electrical supporting structures. The digital media processor 200 may be configured to process the digital media received from the third party content provider 140 and may also be located at the digital media processing facility 120. In some example embodiments, the digital media processing facility 120 may include general purpose hardware and software and be located in an office building.

The digital media processor 200 may further comprise a context fusion processor 220 and a digital media search processor 280. The digital media processor 200 may be a general purpose computer processor or a type of processor designed specifically for the receiving, creation, and distribution of digital media. The context fusion processor 220 may reside at the digital media processor 200 and may be utilized to fuse context provided by context processors described in more detail below and to identify an object associated with digital media provided by the third party content provider 140. An example embodiment of the context fusion processor 220 including various modules is described by a way of example with reference to FIG. 3 below. A method that may be utilized to process digital media at the context fusion processor 220 is described by a way of example with reference to FIG. 5 below.

The digital media search processor 280 may, in some example embodiments, be utilized to facilitate searching of the feeds or digital media by receiving and fulfilling requests sent by the digital media viewing application 112. In some example embodiments, the digital media search processor 280 may utilize indexed data provided by the context fusion processor 220. The digital media search processor 280 may be a computer-driven application for automatically identifying a person from a digital video feed. The network 130 may be a network of data processing nodes that are interconnected for the purpose of data communication.

The third party content provider 140 may further comprise a digital media content generator 142 and the satellite dish 184. The third party content provider 140 may be an entity that owns or has the right to digital media content such as digital videos. As an example, the third party content provider 140 may be a news service that provides reports to digital media broadcasters. The digital media content generator 142 may be a software application generating digital media content and transmitting the digital media content via the satellite dish 184 or the network 130 to be received at the digital media processing facility 120. A system to process digital media is described by way of example with reference to FIG. 2.

Figure 2:
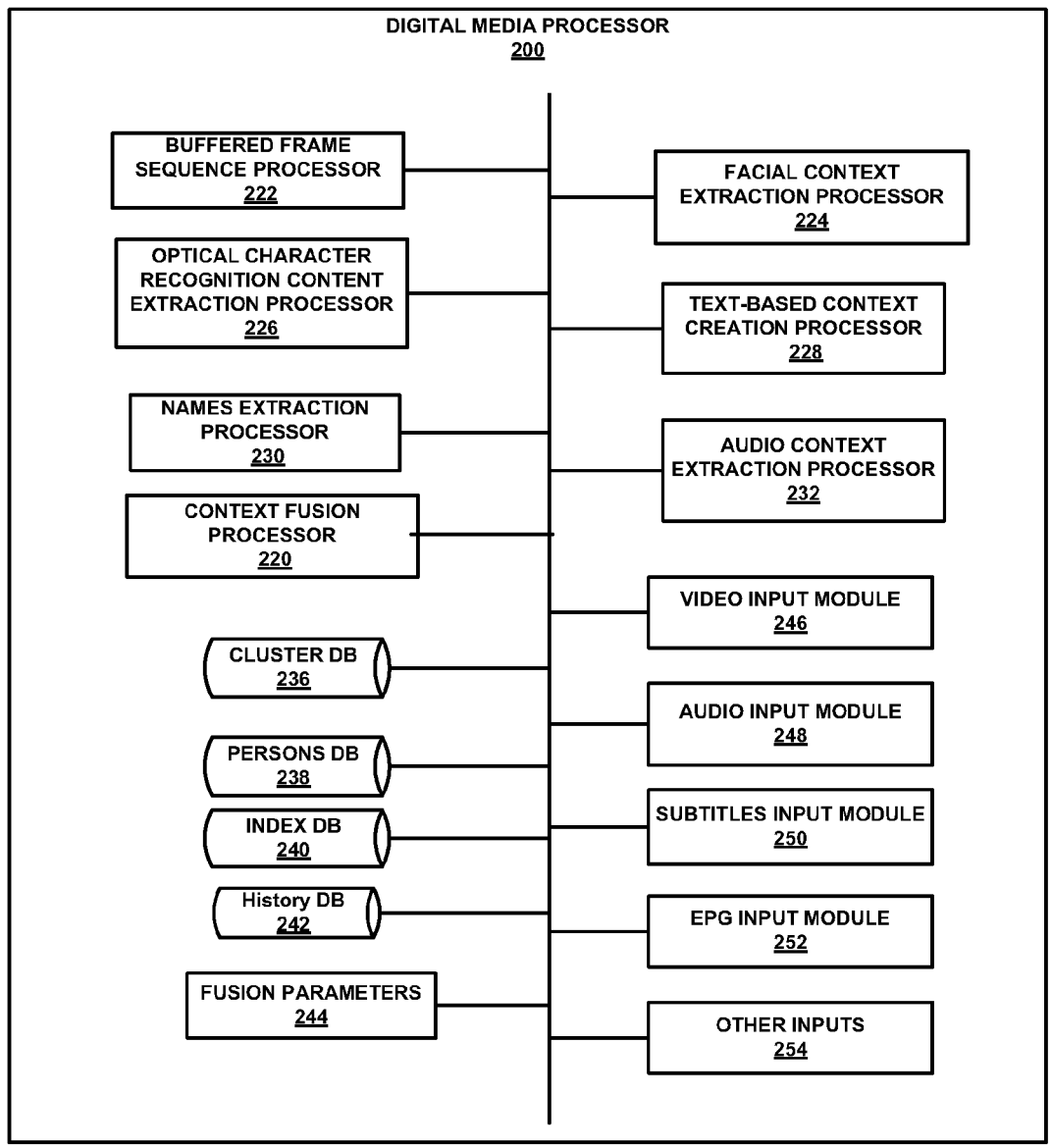
FIG. 2 is a block diagram showing a digital media processor in accordance with an example embodiment.

As shown in FIG. 2, the digital media processor 200 comprises a buffered frame sequence processor 222, various context extraction processors such as a facial context extraction processor 224, an optical character recognition content extraction processor 226, a text-based context creation processor 228, a names extraction processor 230, an audio context extraction processor 232, and a context fusion processor 220. The digital media processor 200 also comprises a number of the databases such as a cluster DB 236, a persons DB 238, an index DB 240, and a history DB 242. The digital media processor 200 also comprises a number of input modules such as fusion parameters 244, a video input 246, an audio input 248, a subtitles input 250, an EPG input 252, and other inputs 254.

The buffered frame sequence processor 222 and various context extraction processors may be configured, in an example embodiment, to receive a video clip and extract various information utilized in the identification of the person appearing in the video clip. The buffered frame sequence processor 222, in an example embodiment, may be configured to process video feeds received from the third party content provider 140 (FIG. 1). A video feed may be partitioned into video clips of certain time durations or into video clips having a certain number of frames. The processed video frames may be received by the facial context extraction processor 224, which is configured to extract and detect the facial image of the person appearing in the video frames. Thus, the facial context extraction processor 224, in an example embodiment, may process frames received from the buffered frame sequence processor 222 in order to detect facial images contained in the video frames. Once the facial images are extracted, the facial context extraction processor 224 may suggest, based on comparison to known reference objects, the identity of the person appearing in the video frames. The facial context extraction processor 224 may also be configured to extract textual context of the video frames to be saved for further processing by the optical character recognition content extraction processor 226. The textual content saved for further processing may be analyzed for possible suggestions with respect to the identity of the unknown object in the text obtained from the same frame as facial image. The method to extract facial context from the received frames is discussed by a way of example with reference to FIG. 6 below.

The optical character recognition content extraction processor 226, in an example embodiment, may be configured to process textual context saved by the facial context extraction processor 224 by translating the images of text in the video frames into machine-editable text. The processed machine-editable text may be then received by the names extraction processor 230 for further processing. The names extracted from the textual content of the frame may be utilized to make suggestions with respect to the identity of the object in the same frame. The text-based context creation processor 228, in an example embodiment, may be configured to receive the subtitles input 250 and the EPG input 252 to create textual content associated with the object in the frame. The textual content may be further processed by the names extraction processor 230 to influence the suggestion made with respect to the identity of the object in the same frame.

The names extraction processor 230, in an example embodiment, may be configured to receive the textual content processed by the optical character recognition content extraction processor 226 and the text-based context creation processor 228. The extracted text may be compared to the known names of objects in order to influence identification of the object appearing in the same frame as the textual content. If the extracted text does not match any of the known names, the names extraction processor 230 may utilize a known algorithm to determine the number of operations needed to transform the extracted text into any of the known names. As an example, the Levenstein distance algorithm may be utilized to measure the edit distance between the extracted text and the known names.

The audio context extraction processor 232, in an example embodiment, may be configured to receive audio input 248 in order to recognize voice and to make a suggestion with respect to the identity of the object appearing in the video. The audio context extraction processor 232 may also be configured to convert a speech signal into a sequence of words in the form of digital data. The words extracted by this speech recognition process may be received by the names extraction processor 230 in order to extract persons names.

The context fusion processor 220, in an example embodiment, may be configured to receive suggestions with respect to the identity of the unknown object appearing in the video clip from various context extraction processors such as facial context extraction processor 224, names extraction processor 230, and audio content extraction processor 232. The context fusion processor 220 may utilize the fusion parameters 244 received from the history DB 242 to assign probabilities to each of the suggestions received from the context extraction processors. In some example embodiments, the fusion parameters 244 may represent a likelihood of correctly predicting the identity of the unknown object. The fusion parameters 244 may be based on the historical values and stored in the history DB 242. For example, if the audio content extraction processor 232 has correctly suggested the identity of the unknown object in 95% of the previous cases, the value of the fusion parameter corresponding to the suggestion made by the audio content extraction processor 232 may be high. If, on the other hand, the audio content extraction processor 232 has correctly predicted the identity of the unknown object in only 15% of the previous cases, the value of the fusion parameter corresponding to the suggestion made by the audio content extraction processor 232 may be low.

A joint distance function may be utilized to determine, based on the fusion parameters 244, the identities suggested by the extraction processors, and based on the distance between the identities and reference objects, a probable identity of the unknown object. It will be noted that the distance as used herein is analogous to a difference vector length or a measure of how close or far apart the reference object and the unknown object are with respect to some vector space. The vector space may be Euclidian or non-Euclidean and, accordingly, the distance metric in the vector space may be Euclidian or non-Euclidean. Once the identity is determined by the context fusion processor 220 based on the suggestions provided by the context extraction processors, the identity, location of the object in the frame, and time of the appearance of the object in the video clip are written to the index database 240.

The cluster DB 236, in an example embodiment, may be a database configured to store clusters of facial images and associated metadata extracted from the video feed. The clusters of facial images may be kept in a cluster cache before they are stored to the cluster DB 236. In some example embodiment, the facial images may be normalized according to predetermined criteria before they are arranged into the clusters. The facial context extraction processor 224 may add the facial image to an existing cluster in the cluster cache if it determines, with a predetermined certainty, that the facial images in the existing cluster cache are associated with the same person as the facial image. It will be noted that the cluster cache may not contain any information, at this point, with respect to the identity of the person associated with the facial images in the cluster.

When the facial context extraction processor 224 cannot, with the predetermined certainty, determine whether the facial image received from the facial context extraction processor 224 and the facial images in the existing clusters are associated with the same person, a new cluster may be created. This may result in more than one cluster being created per one person appearing in the video clip. The context fusion processor 220 may update the cluster metadata contained in the cluster cache and store the cluster to cluster DB 236 automatically when previously unknown objects in the cluster are identified. The cluster metadata may also be updated manually based on the result of a comparison of the facial images from the cluster to known reference objects stored in the persons DB 238.

The persons DB 238, in an example embodiment, is a database configured to store known reference objects. The facial context extraction processor 224 may use the known reference objects stored to the persons DB 238 to compare to the facial images in the clusters and to make suggestions with respect to identity of the person associated with the facial images. The persons DB 238 may also provide known reference objects to the context fusion processor 220 to be utilized in measuring distances between the unknown facial image and the reference objects. The reference objects in the persons DB 238 may be represented by high definition images.

The index DB 240, in an example embodiment, is a database populated by the context fusion processor 220 with the indexed records of identified objects, the objects' position in the video frame, and the time of the object's appearance in the video clip. The history DB 242, in one example embodiment, is a database populated by the clusters stored in the cluster DB 236 after the identification is made by the context fusion processor 220 or it is manually determined that the clusters are associated with correct metadata. The history DB 242, in an example embodiment, may be configured to provide the fusion parameters 244 to the context fusion processor 220 as already described above. The relationships between various example components of the digital media processor 200 are described by a way of example with reference to FIG. 3.

Figure 3:
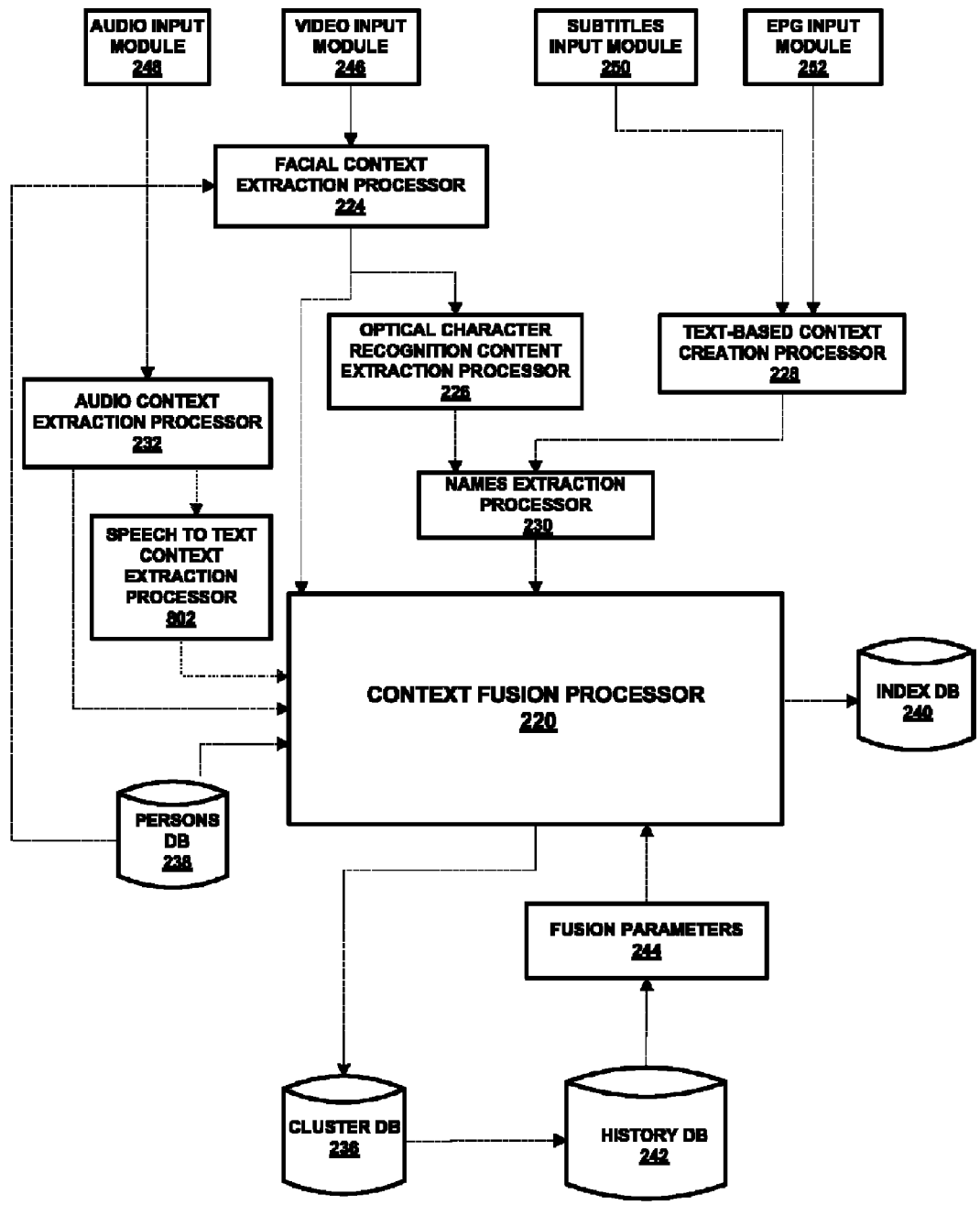
FIG. 3 is a block diagram showing relationships between various components of the digital media processor, in accordance with an example embodiment.

FIG. 3 shows how various inputs are collected and processed. The context fusion processor 220 may use these inputs, together with additional data from the databases, to determine the identity of an unknown object in the video clip. In some example embodiments, a determination of the identity of an unknown object may be performed as the following. For every input i, i being input number 1, 2, 3 . . . N, a distance to each reference object $D_i$ is obtained and weight $w_i$ is assigned to the input based on the historical data received from the history DB 242. Then every distance is recomputed into a confidence value $C_i$, for example, as follows: $C_i=1/(a_i+b_i \cdot D_i^2)$, where $a_i+b_i$ are constants chosen based on historically performed recognitions of unknown objects.

Thereafter, a joint confidence function ($C_w$) may be obtained as $C_w=(w_1C_1)+(w_2C_2)+ \ldots (w_nC_n)$. The joint confidence $C_w$ may be utilized to obtain the joint distance $D_w$ as $D_w=\mathrm{sqrt}\,(1/b_wC_w+a_w/b_w)$. Here $D_i$ may be a distance between vectors of the unknown object and a reference object. $D_i$ may be an edit distance extracted as Levenstein distance. $D_i$ may be a distance showing the unknown object resemblance to the reference objects in the reference database. $D_i$, in some example embodiments, may be a distance indicating voice resemblance to the reference person in the database.

The decision may be made on whether the unknown object is identified as a reference object by comparing the joint distance function value with some threshold learned from the historical recognitions. If the distance value for some reference object is less than the threshold, then the unknown object is identified as this reference object. If there is more than one reference object for which joint distance is less than threshold, then the reference object with the least distance value is chosen. In the presented example, inputs are combined linearly with the weights. However, it will be noted that other joint distance derivation may be used. For example, non-linear combinations of the inputs with weights may be utilized. For example, instead of the partial confidences $C_i$, true conditional probabilities may be utilized$_i$. Any other types of distance to confidence transformation may be utilized.

Figure 4:
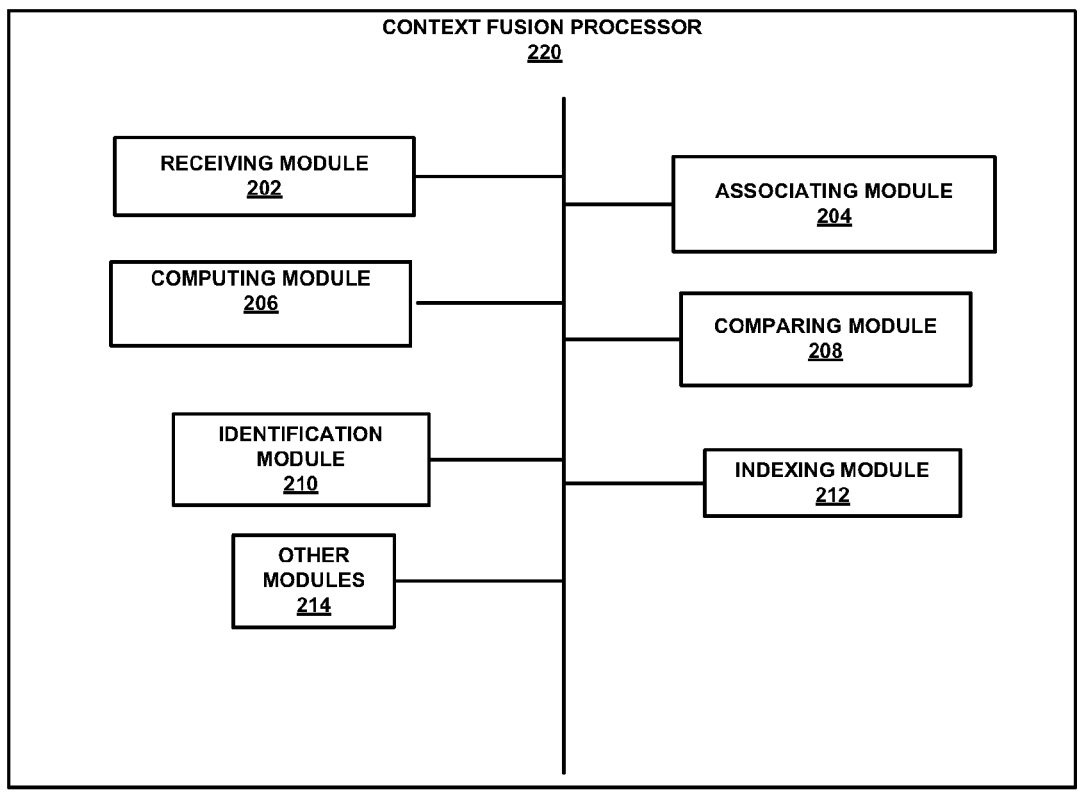
FIG. 4 is a block diagram showing a context fusion processor for processing digital media, in accordance with an example embodiment.

In some example embodiments, the context fusion processor 220 may create indexed records of identified objects and store the indexed records to the index DB 240. Various example components of the context fusion processor 220 are shown in FIG. 4. As shown in FIG. 4, the context fusion processor 220 may comprise a receiving module 202, an associating module 204, a computing module 206, a comparing module 208, an identification module 210, an indexing module 212, and other modules 214. Various operations performed by the context fusion processor 220 are described by a way of example with reference to an example method 500 of FIG. 5.

Figure 5:
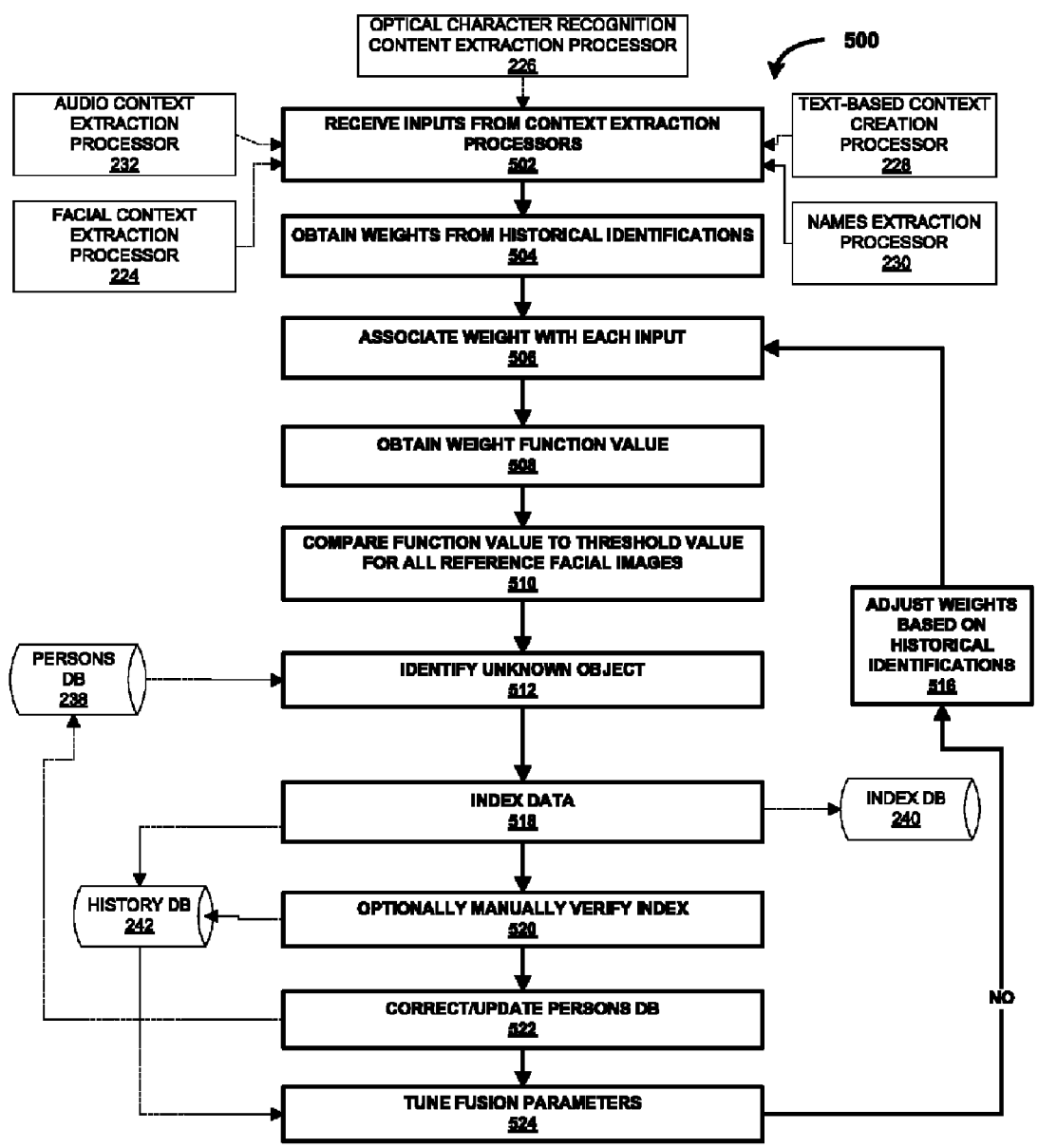
FIG. 5 is a flow diagram showing a method for processing digital media, in accordance with an example embodiment.

FIG. 5 shows a method 500 for processing digital media, in accordance with one example embodiment. The method 500 may be performed by processing logic that may comprise hardware (e.g., dedicated logic, programmable logic, microcode, etc.), software (such as may be run on a general purpose computer system or a dedicated machine), or a combination of both. In one example embodiment, the processing logic resides at the digital media processor 200 illustrated in FIG. 2. The method 500 may be performed by the various modules discussed above with reference to FIG. 4. These modules may comprise processing logic.

As shown in FIG. 5, the method 500 commences with the receiving module 202, shown in FIG. 4, receiving inputs from context extraction processors at operation 502. In some example embodiments, each input received from a context extraction processor may be a distance between an unknown object detected by the facial context extraction processor 224 and a suggested reference object selected among the reference objects of the persons DB 238. As mentioned above with reference to FIG. 3, the digital media inputs utilized by the extraction possessors to produce inputs to be received by the receiving module 202 may comprise facial images detected in a video frame, an EPG, a television channel identifier, subtitles accompanying a video stream, optical character recognition data, human voices detected in the audio accompanying the video, textual data derived from the accompanying audio, and a transcript of the audio derived from the video stream.

The suggestions received from various context extraction processors by the receiving module 202 may represent distances between the unknown object and the reference objects. In some example embodiments, there may be more than one suggestion received from a single content extraction processor. Multiple suggestions received from a single context extraction processor may indicate that multiple reference objects look similar to the unknown object. At operation 502 there may be more than one suggestion received from a single context extraction processor because more than one reference object may be determined to be within a certain threshold distance of the unknown object. In some example embodiments, only the shortest distance between the reference object and the unknown object is received from a single context extraction processor. In some example embodiments, the input distances to reference objects received from the context extraction processors are expressed as a norm of vectors difference in a non-Euclidean coordinate system.

As mentioned above, each input received by the receiving module 202 may represent a distance between the unknown object and a reference object, where the likelihood of the correct identification may become greater as the distance gets smaller. Depending on which extraction processor is supplying the input to the receiving module 202, the distance may be of different kind. The distance received from the facial context extraction processor 224 represents the distance between the unknown facial image and the reference facial image. The distance received from the audio context extraction processor 232 represents the difference between the voice of the unknown object and the known reference object. The distance received from the names extraction processor 230 represents the distance between the name of the unknown object and the name of the known reference object. When the number of reference objects within a certain threshold distance of the unknown object is large, the weight assigned to the suggestions associated with the corresponding content extraction processor may be smaller because of a higher likelihood of incorrect identification.

At operation 504, the receiving module 202 may receive relative weights to be associated with the inputs received at operation 502. The relative weights may represent likelihoods that the distances between the reference objects and the unknown objects have been correctly determined. In some example embodiments, the weights may be based on the historical probabilities of correct identification obtained from the history DB 242, shown in FIG. 3. Utilization of the historical data may imply that a part of a processed video stream is manually verified to fill in the history DB 242 and derive historical probabilities. As an example, a context extraction processor may correctly determine the distance between the reference object and the unknown object to be the smallest in 90% of identification attempts. In such 90% of the identification cases, the reference object may subsequently be determined to be the unknown object. Accordingly, the weight associated with such a suggestion may be higher than the weight associated with the input that has only been correct in 30% of the historical cases. Historical probability of an object or person's appearance in a given category of video may be used to determine the likelihood of the unknown object to appear in the video. Thus, the more frequently a person appears in the video, the more probable it is that any object or face detected in the video is of that person and, accordingly, the weight associated with such person may be increased.

In some example embodiments, the weights of the inputs may be determined by the corresponding extraction processors based on how many other possible reference objects are within the threshold distance of the unknown object. As an example, if an extraction processor has three possible matches within a certain threshold distance of each other, the weight assigned to the input may be smaller because the likelihood of an error is higher. Since the inputs are not homogeneous and may be based on analyses of a video frame, accompanying audio, subtitles, and other digital media, the weights assigned to each input based on the historical data may not directly correlate with the percentage of previous correct identifications.

In some example embodiments, there may be additional factors affecting the relative weights associated with the inputs. Such factors may include whether or not the reference objects and the unknown object are being seen on the same TV set, same TV channel, same news channel, and the same web broadcast. Other factors may include a category of the video clip comprising social life, sports, politics, fashion, show business, finance, and stock market. Information regarding the category of the video clip may be derived from the EPG, a video transcript, or be previously learned. A locale of the context of the video may also affect the relative weights of the inputs. As an example, if a video has been filmed in France, then it is more likely that a French national is appearing in the video rather than a national of a different country.

At operation 506, the relative weights received by receiving module 202 may be associated with their respective inputs by the associating module 204, shown in FIG. 4. In some example embodiments, to simplify calculations discussed below, the weight of each input may be normalized so that the sum of the weights received by the receiving module 202 is equal to the unit weight (e.g., 1). The inputs and their associated weights may be utilized by the context fusion processor 220 to determine the distance between the reference objects and unknown object based on the inputs and their weights received by the receiving module 202 of FIG. 4. A weight function may be utilized to determine the distance.

At operation 508, the computing module 206, shown in FIG. 4, may utilize the weight function to compute the distance between the unknown object and the reference objects from the persons DB 238, shown in FIG. 3. The weight function may be utilized to perform a sum, integral, or average operation in order to give some elements more of a "weight" than others. Depending on the threshold distance values set for individual context extraction processors, the distance weight value may be calculated for a different set of the reference objects.

In some example embodiments, the value of the joint distance function may be computed for every reference object in the persons DB 238. At operation 508, the value of the joint distance function representing the distance between the unknown object and a reference object from the persons DB 238 may be computed by the computing module 206, shown in FIG. 4, based on the inputs and their relative weights. As an example, the value of the joint distance function $D_w$ may be computed by the computing module 206 as the following: $D_w$=sqrt $(1/b_w C_w + a_w/b_w)$, where $C_w$ is joint confidence computed as a weighted sum of input confidences: $C_w=(w_1 C_1)+(w_2 C_2)+ \ldots (w_n C_n)$ and each particular input confidence is obtained from an input's distance to a reference object as $C_i=1/(a_i+b_i \cdot D_i^2)$. Here $w_i$ (i=1, 2, ... n) is the weight corresponding to the input $D_i$, and $D_i$ (i=1, 2 ... n) being the distance to the reference object in input modality received from one of the context extraction processors. Constants $a_x$ and $b_x$ may be learned from historical data stored in the history DB 242. As explained above with reference to FIG. 2, the inputs received from the context extraction processors represent distances between the unknown object and the reference objects from the persons DB 238.

At operation 510, the comparing module 208, shown in FIG. 4, may be utilized to compare the values of the joint distance function computed by the computing module 206 to the predetermined threshold values. Because the values of the joint distance function are distances between the unknown object and the reference objects, the predetermined threshold values are set to ensure that the computed distances are within a certain range. Accordingly, the facial image may be assumed to be correctly identified when the value of the joint distance function is the smallest of the distances calculated for the reference facial images set and is smaller than a threshold value.

As an example, the facial image of the unknown person may be represented by a point in some mathematical space and the value of the joint distance function may represent the radius of a sphere in that space. If the point representing the facial image of the reference image is within the sphere, the facial image of the unknown person and the facial image of the reference person may be assumed to be associated with the same person. The distances between the unknown object and the reference objects may be calculated for each reference person in the persons DB 238. The metadata stored in the persons DB 238 along with the reference objects may include the name of the person associated with the reference object and the person's occupations or professions. The metadata may result in an increase of the relative weight assigned to the input if the video feed and the person's occupation correspond thematically. Information regarding the theme of the video feed may be extracted from the EPG. In some example embodiments, frequent appearances of the person in the videos with a certain theme may increase the relative weight associated with the input.

At operation 512, based on the results of the comparisons made by the comparing module 208, the identification module 210, shown in FIG. 4, may make an identification of the unknown object. The unknown object, in some example embodiments, may be a facial image. In some identification cases, the reference object and the unknown object may be correctly identified as the same object, but the metadata may be assigned to the reference object in the persons DB 238 that is incorrect. Accordingly, an incorrect identification may result, and at operation 512, the persons DB 238 may be corrected or updated manually by performing a visual check. Thus, an operator performing a visual check may utilize his prior knowledge to determine that the reference object is not correctly labelled and update the persons DB 238.

At operation 522, the fusion parameters 244 may be tuned in order to more correctly represent the likelihood of each context extraction input predicting the identity of the unknown object. Such determination may be based on the identification made at operation 512. At operation 522, it may be determined whether or not there is a high likelihood of correct identification made at operation 512. If, for example, the identification is made based on relative weights received from previously utilized fusion parameters, a process may be run against the history DB 242, shown in FIG. 3, to determine whether the relative weights associated with the inputs correlate to the historical identifications. If the relative weights are not typical of the historical identifications, the relative weights may be readjusted based on the historical identifications at operations 524 and 516 and re-associated with the inputs at operation 506. A distance function weight value may be obtained again based on the new relative weights at operation 508 and the process of the comparing and the identification repeated at operations 510 and 512. Thus, a method described herein is a constantly improving process of identification of objects or persons in videos achieved by improving recognition parameters for every category of video.

If, on the contrary, the relative weights are typical of the historical identifications, the indexing module 212, shown in FIG. 4, may create an index file or add new index data to an existing index file. For each frame in the input video stream, a corresponding record may be created in the index file having a record identifier, the identity of the object, the spatial position of the object in the frame, and the time of appearance of the object in the video. The data indexed at operation 518 may consequently be used to permit users to search videos for objects by name and allow users to view videos exactly from the moment when the object appeared in the video stream. Other modules 214, shown in FIG. 4, may be used to facilitate operations of the context fusion processor 220. Various operations performed by the facial context extraction processor 224 are described by way of example with reference to FIG. 6.

Figure 6:
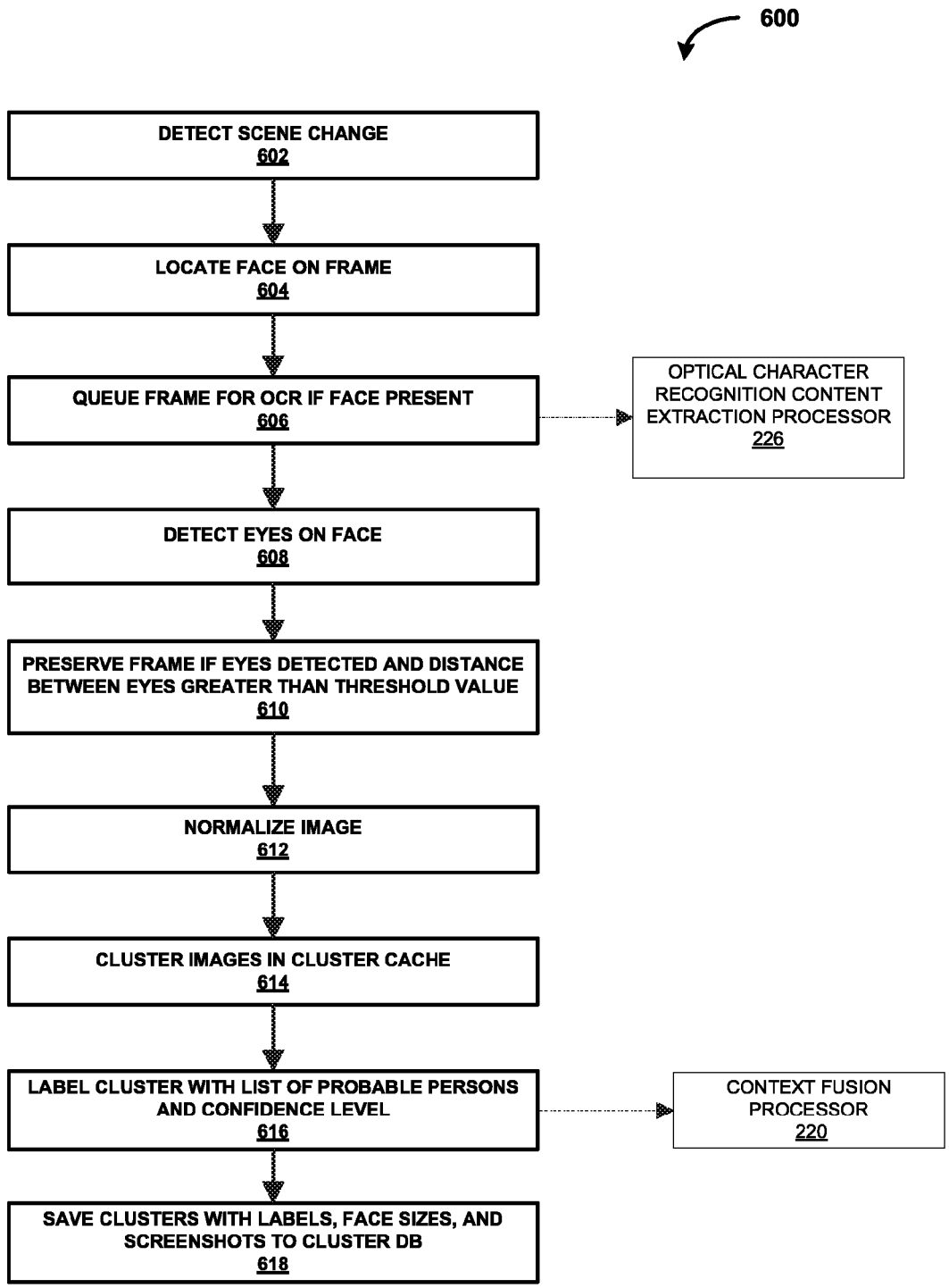
FIG. 6 is a flow diagram showing a method for object extraction and storing, in accordance with an example embodiment.

FIG. 6 illustrates a method 600 for object extraction and storing, in accordance with an example embodiment. The method 600 may be performed by the various modules discussed above with reference to FIG. 2. As shown in FIG. 6, the method 600 may commence at operation 602 with detecting a scene change in a frame received from the buffered frame sequence processor 222. At operation 604, the object to be identified may be located in the frame. In some example embodiments, the object detection may not be initially performed on each frame. Instead the object, such as a facial image, may be detected in the first and the last frame of the buffered part of the input video stream and the likely locations of the object approximated across the frames located between the first and last frames of every buffer. Regions that are less likely to contain the objects may be excluded from further detection to increase performance.

At operation 606, the frame may be queued for OCR (optical character recognition) processing if an object is present in the frame. The OCR content extraction processor 226 may be subsequently utilized to process the textual context of the frame. The OCR processing is described in more detail with reference to FIG. 7 of the drawings below. At operation 608, eyes may be detected in the frames where a facial image was already detected. The eye detection may be implemented by detection of eye pupil centers by any of a number of known methods. The eye detection may be utilized in normalizing the facial image.

As an example, AdaBoost (Adaptive Boosting) algorithm, trained on sets of eye images, may be used to detect eye pupil centers in the extracted facial images. This method may be used without first normalizing the images to be in a frontal orientation. Other face detection methods may be based on direct detection of eye pupils. At operation 610, a determination may be made to preserve the frames if the distance between the eyes is greater than a threshold distance. For example, the faces with the distance between eyes of less than 40 pixels may be suppressed and not used when identifying the object. At operation 612, the facial images previously detected at operation 610 are normalized to be in a horizontal orientation, for light intensity, and by size so that the coordinates of the eye centers in the facial image have certain fixed values.

At operation 614, the facial mages normalized at operation 612 may be clustered in a cluster cache. Each facial image is added to an existing facial image if the facial image is identified as similar to an existing facial image. Such identification may mean that a cluster for this object has been previously created. Every face in a cluster may have an associated presence rate, representing how many images similar to the face are detected in the video stream. To determine whether the facial image represents an object from a previously detected cluster, the distance between the current facial image and the previous facial images is measured. If the distance is below a predetermined threshold, the facial image may be assumed to represent a person for whom a cluster has already been created. In some example embodiments, if the distance is below a predetermined threshold, there may be no additional value in saving an almost identical facial image, and, correspondingly, the facial image may be dropped. If, on the other hand, the difference between the facial images in the previously created clusters and the newly normalized facial image is greater than a predetermined threshold, the image may belong to a different unknown object, and accordingly, a new cluster may be started. In some example embodiments, there may be more than one cluster created for the same unknown object.

At operation 616, the cluster caches created at operation 614 may be labeled with a list of probable objects and confidence levels that correspond to each probable object identified as such from the normalized facial images. The identification of the normalized facial images is based on a calculation of distances of the unknown object to every reference image from the persons DB 238. Clusters with overall presence rated below a certain threshold may be discarded and not used in further processing. At operation 618, the cluster caches created at operation 614 may be saved to the cluster DB 236 along with labels, face sizes, and screenshots. As discussed above, the facial context extraction processor 224 may save textual context extracted from the input video stream for subsequent processing by the optical character recognition content extraction processor 226. Because such textual context may contain names of the persons appearing in the input video stream, it may be helpful in the identification of such persons. Various operations performed by the optical character recognition content extraction processor 226 are described by way of example with reference to an example method 700 of FIG. 7.

Figure 7:
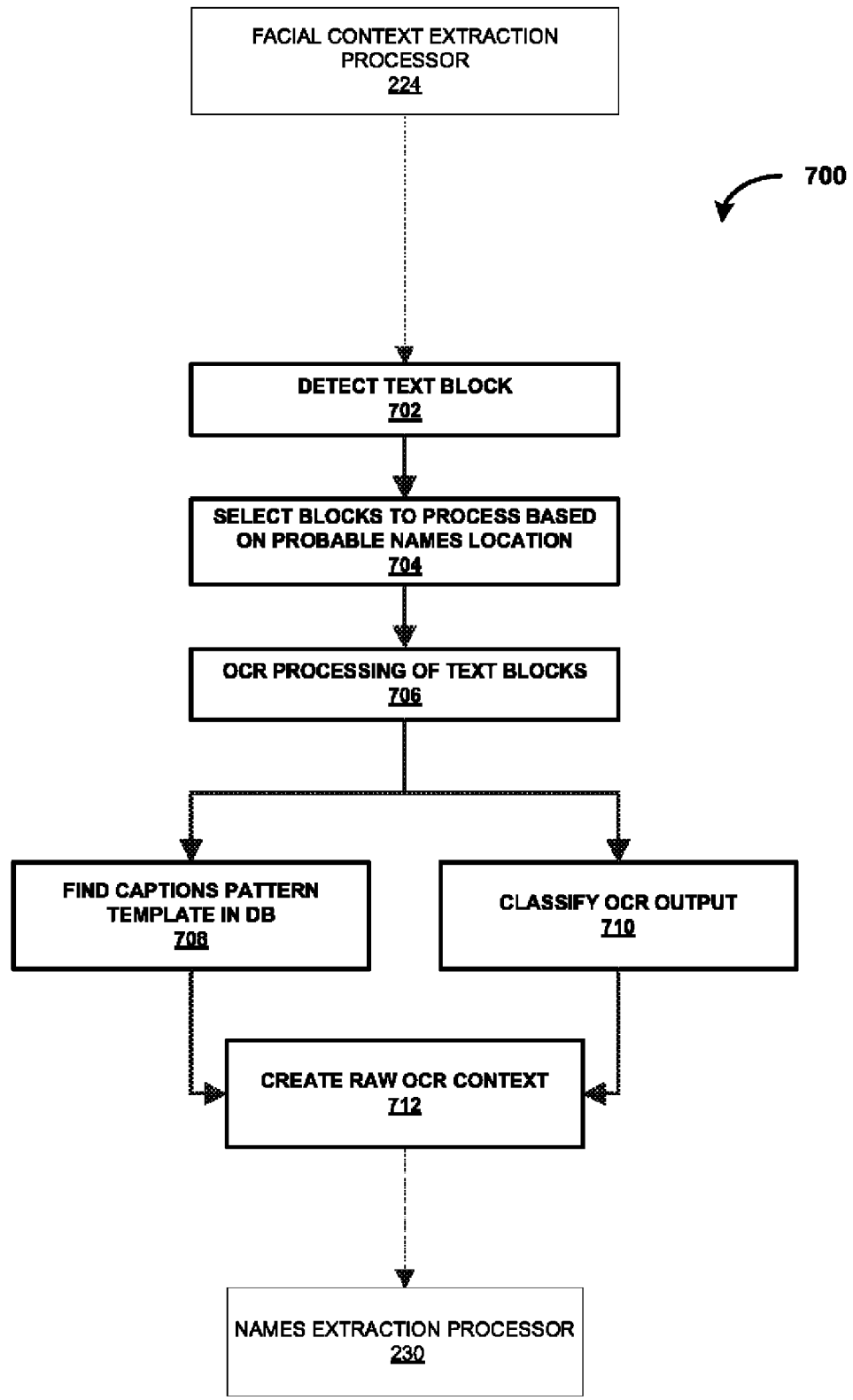
FIG. 7 is a flow diagram showing a method for identifying text blocks associated with objects within an image utilizing optical character recognition of relevant text, in accordance with an example embodiment.

FIG. 7 illustrates a method for identifying text blocks associated with face objects within an image for optical character recognition of relevant text, in accordance with an example embodiment. The method 700 may be performed by the various modules discussed above with reference to FIG. 2. These modules may comprise processing logic. At operation 702, a text block may be detected in a frame saved for OCR by operation 606 as described above with reference to FIG. 6 of the drawings.

At operation 704, frame blocks may be selected based on probable name locations within the textual content. The probable names may be subsequently determined by using an edit distance method to measure a number of transformations it may take to change a word into a name, thus determining the likelihood of the textual content to include names (e.g., Levenstein method), as mentioned above with reference to FIG. 2 of the drawings. At operation 706, the optical character recognition content extraction processor 226 may process text blocks, find caption patterns template at operation 708, classify OCR output at operation 710, and create raw OCR context at operation 712. The raw OCR context created at operation 712 may be processed by the names extraction processor 230 to extract names from the raw OCR context. Various operations performed by the names extraction processor 230 are described by way of example with reference to an example method 800 of FIG. 8.

Figure 8:
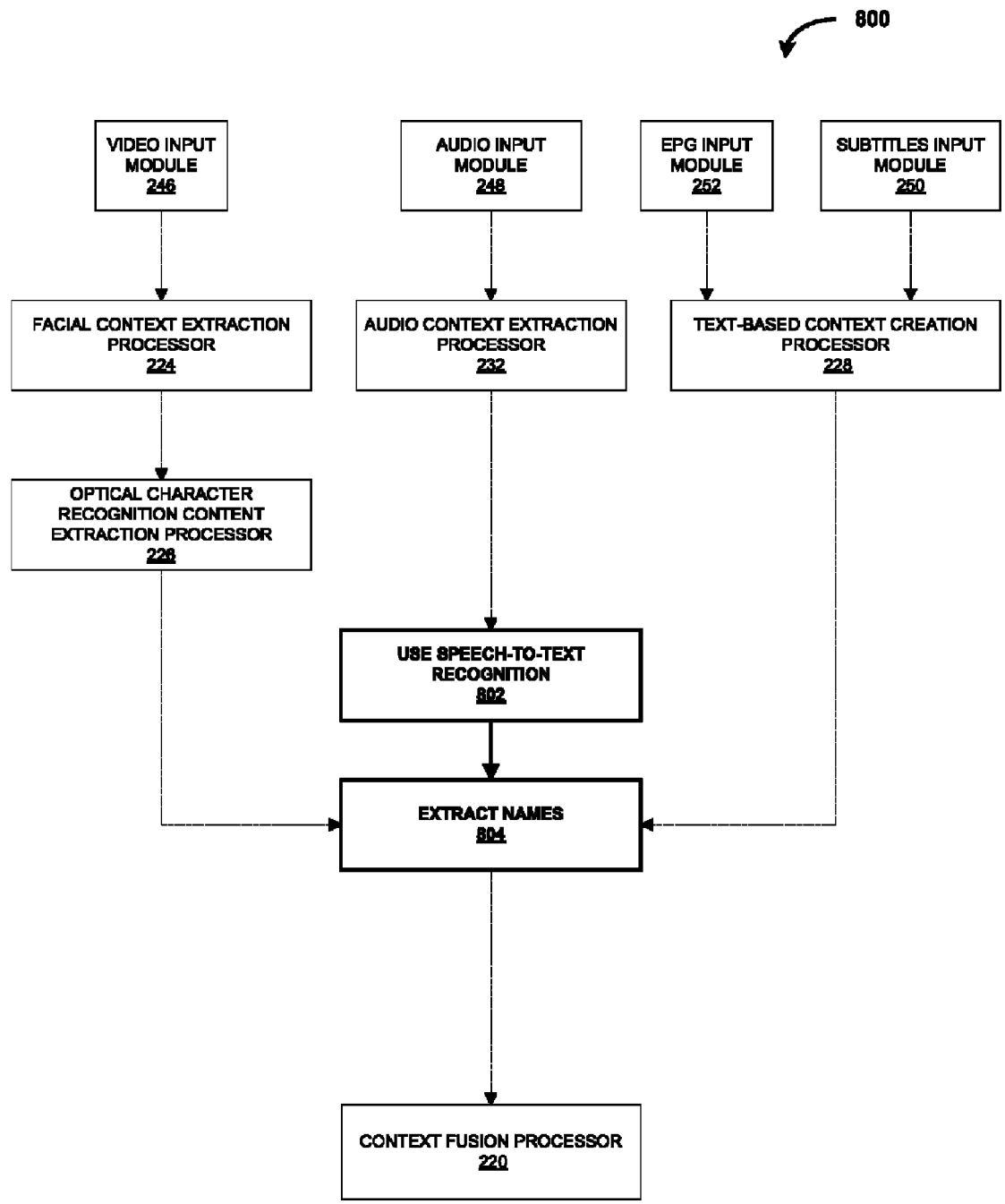
FIG. 8 is a flow diagram showing a method for identifying names associated with an object in a video clip, in accordance with an example embodiment.

FIG. 8 illustrates a method for identifying names associated with an object in a video clip, in accordance with an example embodiment. The method 800 may be performed by the various modules discussed above with reference to FIG. 2. These modules may comprise processing logic. As shown in FIG. 8, the method 800 commences at operation 802 with speech-to-text recognition technology being used to translate audio received from the audio context extraction processor 232 into text. At operation 804, the textual context received from the optical character recognition content extraction processor 226 and the text-based context creation processor 228 is used, along with the text recognized at operation 802, to extract names. The names extracted at operation 804 are made available to be utilized by the context fusion processor 220 when making the identification of the unknown object.

Figure 9:
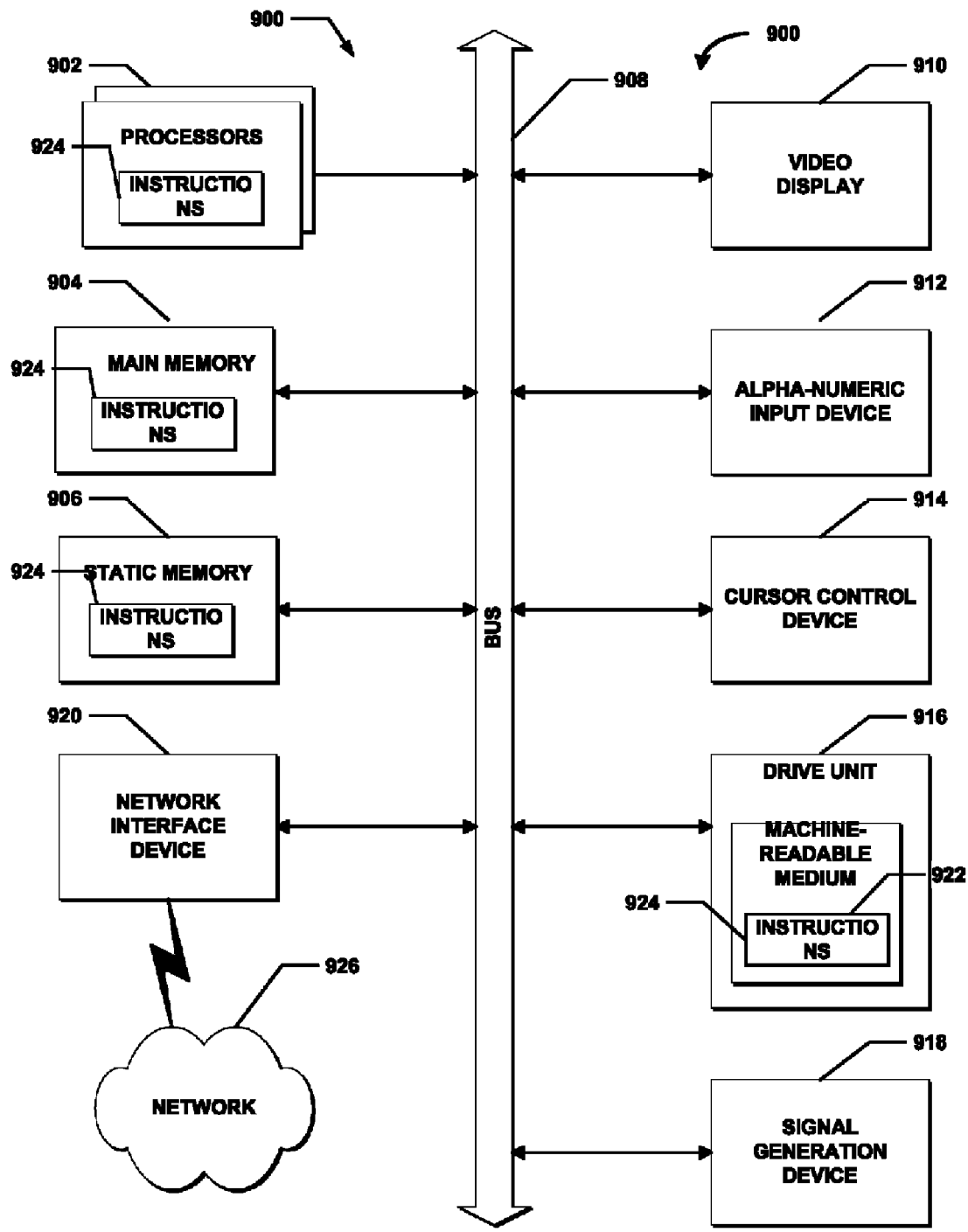
FIG. 9 is a diagrammatic representation of an example machine in the form of a computer system within which a set of instructions for causing the machine to perform any one or more of the methodologies discussed herein are executed.

FIG. 9 shows a diagrammatic representation of a machine in the example electronic form of a computer system 900, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor or multiple processors 902 (e.g., a central processing unit (CPU), a graphics processing unit (GPU), or both), and a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a computer-readable medium 922 on which is stored one or more sets of instructions and data structures (e.g., instructions 924) embodying or utilized by any one or more of the methodologies or functions described herein. The instructions 924 may also reside, completely or at least partially, within the main memory 904 and/or within the processors 902 during execution thereof by the computer system 900. The main memory 904 and the processors 902 also constitute machine-readable media.

The instructions 924 may further be transmitted or received over a network 926 via the network interface device 920 utilizing any one of a number of well-known transfer protocols (e.g., Hyper Text Transfer Protocol (HTTP)).

While the computer-readable medium 922 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, a method and system of object searching and identification using video and audio classifiers has been described. Although embodiments have been described with reference to specific example embodiments, it will be evident that various modifications and changes may be made to these example embodiments without departing from the broader spirit and scope of the present application. Accordingly, the specification and drawings are to be regarded in an illustrative rather than a restrictive sense.

The invention claimed is:

1. A method for identifying objects in a video, the method comprising:
   detecting a first input probable to identify an object in one or more video frames in a video stream of the video, the first input being an image of the object;
   determining one or more second inputs probable to identify the object in the video frames, wherein the second inputs comprise additional data extracted from at least one of the video stream and an accompanying audio stream of the video;
   associating the second inputs with the object;
   obtaining distance values between each input and a plurality of reference objects, wherein a distance value indicates a closeness of an input to an identity of a reference object;
   responsive to obtaining distance values for an input, associating a relative weight with the input based on the likelihood of the input to identify the object as a reference object;
   calculating joint distance values between the object and the reference objects, wherein a joint distance value is a weighted transformation of distance values between a plurality of inputs and a reference object;
   comparing the joint distance values calculated for the object; and
   identifying the object as a reference object based on the comparing.

2. The method of claim 1, wherein a joint distance value comprises an Euclidean or a non-Euclidean distance between vectors representing a reference object and the object in an input modality.

3. The method of claim 1, wherein identifying the object as a reference object based on the comparing comprises determining a reference object having a calculated joint distance value less than or equal to a threshold identification value.

4. The method of claim 1, further comprising creating index data for the object, the index data including one or more of the following for the object: an identifier associated with the object, a time at which the object appears in the video stream, a spatial position of the object in one or more video frames of the video stream, and other metadata associated with the object.

5. The method of claim 4, wherein the object is a person and the index data, in response to a search for a name of a person in a video, returns video beginning from a time in which the person appeared on screen.

6. The method of claim 1, wherein the object is a person, and the image of the object is a facial image of the person.

7. The method of claim 2, wherein the input modality is associated with a facial image of a person detected in the video frame and selected from a group consisting of an Electronic Program Guide (EPG), a television channel identifier, sub-titles accompanying the video stream, optical character recognition data (OCR), human voices detected in an accompanying audio, textual data derived from the accompanying audio, a transcript of the video stream, and the facial image.

8. The method of claim 6, wherein the relative weight associated with the facial image is derived from a likelihood of the person to appear in a given category of the video stream, the likelihood based on historical data representing identifications of the person in the category of videos stream.

9. The method of claim 1, wherein determining the second inputs comprises extracting text from one of: analysis of the video frame, text conversion of the accompanying audio, an EPG and subtitles.

10. The method of claim 1, wherein identifying the object is further based on categories of the video stream, the categories selected from a group consisting of same television (TV) set, same TV channel, same news channel, same web broadcast, same category of entertainment, social life, sports, politics, fashion, show business, finance, stock market; the categories of the video stream being derived from a group consisting of EPG, a video transcript, and previously learned information.

11. The method of claim 10, further comprising receiving statistics from identified objects and manually verifying and correcting incorrect indexes.

12. The method of claim 6, wherein determining the second inputs comprises:
   extracting a text block from a frame of the video stream;
   performing OCR on the text block to extract a text from the text block;
   identifying probable names of people or objects from the text;
   associating every object in video frames with probable names;
   comparing distances between the probable names and reference names, each distance being an edit distance between two names; and
   suggesting a name of the object based on the comparing.

13. The method of claim 9, further comprising:
analysing data provided by an EPG identifying the video stream to obtain probable names of people;
detecting a second object in the video frames;
associating the first and second object in the video frames with probable names and corresponding distances to names associated with reference objects;
comparing distances between the probable names and reference names, each distance being an edit distance between two names; and
suggesting a name of an object based on the comparing.

14. The method of claim 1, wherein calculating a joint distance value between the object and a reference object includes the following:
$(C_w)_{D=sqrt}(1/b_w C_w + a_w/b_w)C_w$ being computed as $C_w = (w_1 C_1)+(w_2 C_2)+...(w_n C_n)$ for n inputs associated with the unknown object and having a distance value to the reference object, wherein a weight $w_i$ and a confidence $C_i$ are associated with each i input and the confidence Ci of each i input is computed from an input distance value $D_i$ as $C_i = 1/(a_i + b_i \cdot D_i^2)$, wherein $a_i$ and $b_i$ are constants chosen based on historical data and where weights $w_i$ are assigned to the inputs based on historical data to maximize a correct recognition rate, and the input distance value $D_i$ comprises one of a distance between vectors for the unknown object and a reference object, a distance from the unknown object's inputs probable identity to the reference object, and an edit distance.

15. The method of claim 14, wherein the image of the object is a facial image of a person and Dw defines a joint distance to a facial image of a reference object in a reference database, the facial image being assumed to correctly identify the object as the reference object when Dw is less than a threshold associated with the facial image of the reference object.

16. A system for identifying objects in a video, the system comprising:
a buffered frame sequence processor to process a plurality of video frames in a video stream of the video;
a facial context extraction processor to detect and extract a first input probable to identify an object in one or more video frames in the plurality of video fames the first input being an image of the object;
extraction processors to detect and extract one or more second inputs probable to identify the object in the video frames, wherein the second inputs comprise additional data extracted from at least one of the video stream and an accompanying audio stream of the video;
an associating module to associate the second inputs with the object detected in the video frames and to associate a relative weight with the input based on the likelihood of the input to identify the object as a reference object;
a computing module to obtain values of a distance function from the first and second inputs to reference objects, wherein a distance function value indicates a closeness of an input to an identity of a reference object, and to obtain values of a joint distance function from the object to the reference objects, wherein a joint distance function value is a weighted transformation of distance values between a plurality of inputs and a reference object;
a comparing module to compare the values of the joint distance function for the object; and
an identification module to identify the object as a reference object based on the comparing.

17. The system of claim 16, wherein a joint distance value comprises an Euclidean or a non-Euclidean distance between vectors representing a reference object and the object in an input modality.

18. The system of claim 16, wherein the identification module to identify the object as a reference object based on the comparing comprises determining a reference object having a calculated joint distance value less than or equal to a threshold identification value.

19. The system of claim 16, further comprising an indexing module to create indexed data for the object, the indexed data including one or more of the following for the object: an identifier associated with the object, a time at which the object appears in the video stream, and a spatial position of the object in one or more video frames of the video stream, and other metadata associated with the object.

20. The system of claim 19, wherein the object is a person and the indexed data, in response to a search for a name of a person in a video, returns video beginning from a time in which the person appeared on screen.

21. The system of claim 16, wherein the identification module bases the identifying of the object as the reference object in part on categories of the video stream, the categories comprising same television (TV) set, same TV channel, same news channel, same web broadcast, same category of entertainment, social life, sports, politics, fashion, show business, finance, and stock market, the categories of the video stream derived from Electronic Program Guide (EPG), a video transcript or learned previously.

22. The system of claim 21, wherein the categories of the video stream are determined by gathering statistics from identified objects and from manual verification and correction of incorrect indexes.

23. The system of claim 16, wherein detecting and extracting the second inputs comprises:
an optical character recognition (OCR) content extraction processor to extract a text block from a frame of the video stream;
a text-based context creation processor to perform OCR on the text block to extract text from the text block; and
a names extraction processor to identify probable names of people in the text, associate every object in the video frames with probable names, compare distances between the probable names and reference names, each distance being an edit distance between two names, and to suggest a name of the object based on the comparing.

24. A method for identifying objects in a video, the method comprising;
means of detecting a first input probable to identify an object in one or more video frames in a video stream of the video, the first input being an image of the object;
means of determining one or more second inputs probable to identify the object in the video frames, wherein the second inputs comprise additional data extracted from at least one of the video stream and an accompanying audio stream of the video;
means of associating the second inputs with the object;
means of obtaining distance values between each input and a plurality of reference object, wherein a distance value indicates a closeness of an input to an identity of a reference object;
means of associating a relative weight with an input based on the likelihood of the input to identify the object as a reference object responsive to obtaining distance value of the input;
means of calculating joint distance values between the object and the reference objects, wherein a joint distance value is a weighted transformation of distance values between a plurality of inputs and a reference object;

means of comparing the joint distance values calculated for the object; and means of identifying the object as a reference object based on the comparing.

25. A non-transitory machine-readable medium comprising instructions, which when implemented by one or more processors perform the following operations:

detect a first input probable to identify an object in one or more video frames in a video stream of the video, the first input being an image of the object;

determine one or more second inputs probable to identify the object in the video frames, wherein the second inputs comprise additional data extracted from at least one of the video stream and an accompanying audio stream of the video;

associate the second inputs with the object;

obtain distance values between each input and a plurality of reference objects, wherein a distance value indicates a closeness of an input to an identity of a reference object;

responsive to obtaining distance values for an input, associate a relative weight with the input based on the likelihood of the input to identify the object as a reference object;

calculate joint distance values between the object and the reference objects, wherein a joint distance value is a weighted transformation of distance values between a plurality of inputs and a reference object;

compare the joint distance values calculated for the object; and identify the object as a reference object based on the comparing.

* * * * *